United States Patent
Mulwad et al.

(10) Patent No.: US 10,430,517 B1
(45) Date of Patent: Oct. 1, 2019

(54) APPARATUS, SYSTEM AND METHOD FOR PROVIDING AN AGENT THAT INTELLIGENTLY SOLVES INFORMATION TECHNOLOGY ISSUES

(71) Applicant: General Electric Company, Schenectady, NY (US)

(72) Inventors: Varish Vyankatesh Mulwad, Niskayuna, NY (US); Ivan Bueno, San Ramon, CA (US); Vijaya Raghava Mutharaju, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/113,644

(22) Filed: Aug. 27, 2018

(51) Int. Cl.
*G10L 21/00* (2013.01)
*G06F 17/27* (2006.01)
*G06F 11/07* (2006.01)
*G06F 9/451* (2018.01)
*G10L 25/00* (2013.01)

(52) U.S. Cl.
CPC ........... *G06F 17/278* (2013.01); *G06F 9/453* (2018.02); *G06F 11/0793* (2013.01); *G06F 17/2785* (2013.01)

(58) Field of Classification Search
CPC .............. G06F 17/278; G06F 17/2785; G06F 11/0793; G06F 9/453
USPC ................... 704/2, 270.1, 275, 277
See application file for complete search history.

(56) References Cited

U.S. PATENT DOCUMENTS

2013/0185050 A1* 7/2013 Bird ................ G06F 17/2881
704/2

* cited by examiner

*Primary Examiner* — Thierry L Pham
(74) *Attorney, Agent, or Firm* — Steven M. Shape; Dennemeyer & Associates, LLC

(57) ABSTRACT

An apparatus, system and method of providing an artificially intelligent (AI) agent capable of assisting information technology (IT) personnel in addressing an IT ticket. The AI agent may include a visualization interface for display capable of receiving dialog from the IT personnel related to the IT ticket; a translation module capable of translating the received dialog to at least one machine language translation; a solutions module capable of receiving the machine language translation, comparing the machine language to a plurality of prospective solutions for IT issues, and selecting a subset of the plurality of prospective solutions deemed most relevant to the IT ticket and returning that subset to the visualization interface; and a feedback module capable of receiving explicit and implied feedback from the IT personal regarding the machine language translation and the selected subset, wherein the selecting of the subset varies upon subsequent received dialog according to the feedback.

21 Claims, 7 Drawing Sheets

APPARATUS, SYSTEM AND METHOD FOR PROVIDING AN AGENT THAT INTELLIGENTLY SOLVES INFORMATION TECHNOLOGY ISSUES

FIELD

The present disclosure relates to information technology, and, more specifically, to an apparatus, system and method for providing an agent that intelligently solves information technology issues.

BACKGROUND

In a typical enterprise having a significant number of "clients", such as employees, using mobile and stationary computing devices connected to a network of the enterprise, the enterprise employs information technology (IT) personnel to manage the client devices and the network of the enterprise. These IT personnel frequently have to address IT issues, such as in relation to the connectivity, efficiency, and/or security of the client devices, their communications, and the network, as such IT issues arise. When an IT issues arises, it is often the subject of an electronic "ticket" that is to be addressed by the IT personnel, wherein the ticket typically includes information on the IT issue, the IT issue's effects or source, and/or the symptoms that the IT issue causes.

In the known art, when IT personnel attempted to resolve a ticket, he/she might enter into an electronic interface an issue note, such as in relation to the ticket or an attempted solution for the ticket, such as "Outlook was not opening. I tried to fix the problem by resetting the profile." The IT personnel might then select the issue category, such as "Outlook", from a menu provided by the electronic interface of a large number, such as more than 70, available values. The manual nature of this process made mis-classification of IT issues likely, and often also led to differences in classifications or considered solutions as between IT personnel, even if those if personnel were within the same enterprise. Thus, the likelihood that the information related to that particular instance of the IT issue, and/or the optimality of a proposed solution to that IT issue, could be easily accessed later, particularly by a different IT person, to inform future decisions was minimal.

Further, the known art affords no opportunity to override a category selected previously, whether that category was selected by the current IT personnel using the electronic interface or by another IT personnel. Nor does the known art allow for IT personnel to make judgments about the favorability of prior attempted solutions to an IT issue, but rather allows only for the entry of issue notes by IT personnel on the presently-attempted solution. Thus, as a particular IT person learns in her position, or as multiple IT personnel at an enterprise enhance their collective knowledge base over time, that learning cannot be readily reflected for addressing future issues within the typical IT ticket system.

Yet further, the known art provides little in the way of guidance to IT personnel who do not have significant experience and/or preconceived ideas of how to address an open IT ticket. That is, the historic accumulation of knowledge regarding the addressing of IT issues, either within the enterprise or outside of it, is not typically available to the IT personnel through typical known electronic IT ticket systems.

Therefore, the need exists for an apparatus, system, and method for an agent that intelligently addresses IT issues.

SUMMARY

The disclosure includes at least an apparatus, system and method of providing an artificially intelligent (AI) agent capable of assisting an information technology (IT) personnel in addressing an IT ticket. The AI agent may include a visualization interface capable of receiving dialog from the IT personnel related to the IT ticket; a translation module capable of translating the received dialog to at least one machine language translation; a solutions module capable of receiving the machine language translation, comparing the machine language to a plurality of prospective solutions for IT issues, and selecting a subset of the plurality of prospective solutions deemed most relevant to the IT ticket and returning that subset to the visualization interface; and a feedback module capable of receiving explicit and implied feedback from the IT personal regarding the machine language translation and the selected subset, wherein the selecting of the subset varies upon subsequent received dialog according to the feedback.

At least one of the translation module and the solutions module may comprise a classification module that classifies the received dialog. The classification module may apply a natural language model to the received dialog.

In embodiments, the feedback module may comprise elections of users other than the IT personnel from subsets responsive to IT issues similar to the IT ticket. The other users may be intra-enterprise with the IT personnel, or extra-enterprise with the IT personnel. In extra-enterprise embodiments, any information related to the other users and the similar IT issues may be anonymized.

Thus, the disclosed embodiments provide an apparatus, system, and method for an agent that intelligently addresses IT issues.

BRIEF DESCRIPTION OF THE DRAWINGS

The disclosed non-limiting embodiments are discussed in relation to the drawings appended hereto and forming part hereof, wherein like numerals may indicate like elements, and in which.

DETAILED DESCRIPTION

Figure 1:
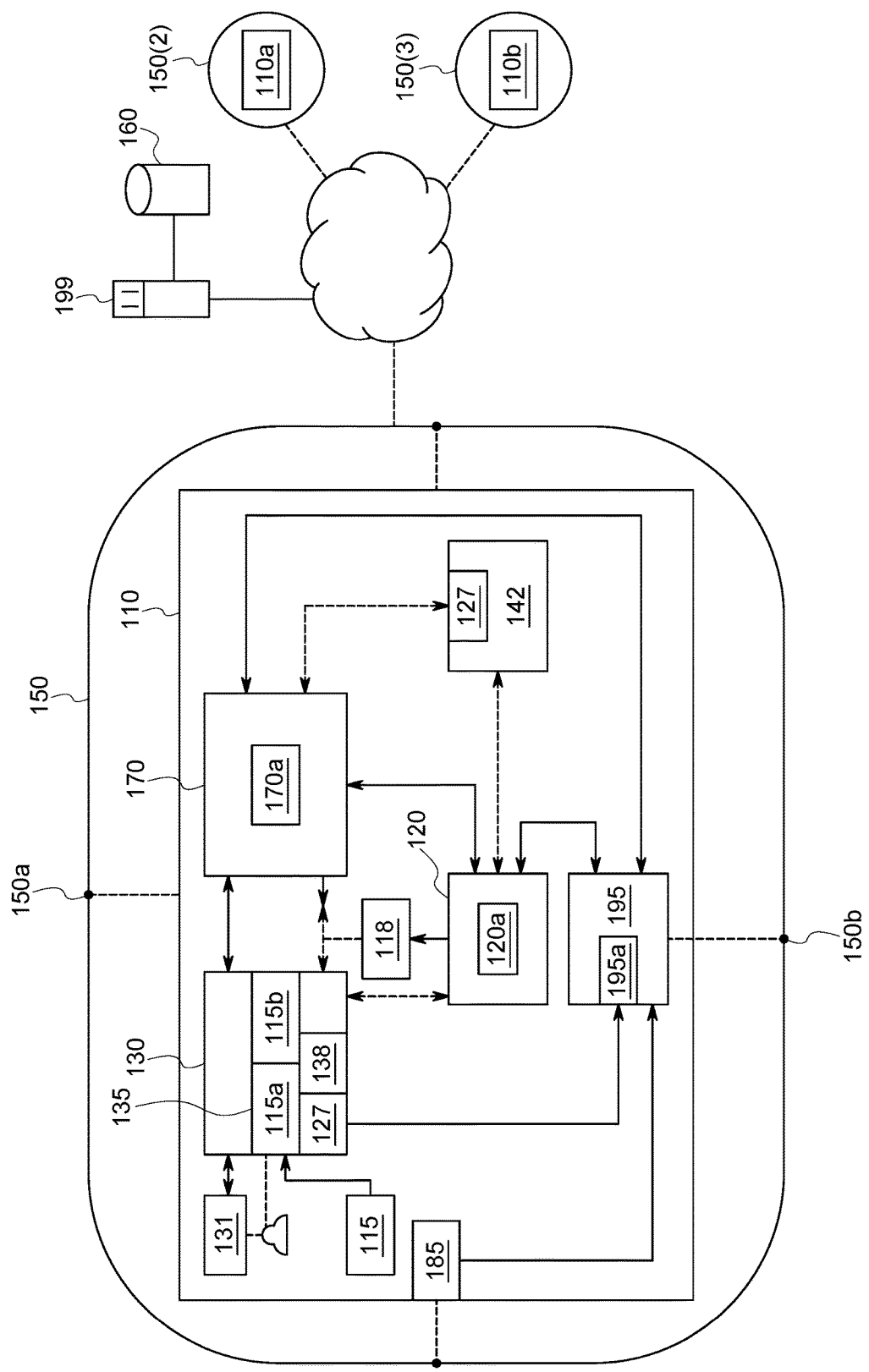
FIG. 1 is an illustration of a system for intelligently addressing IT issues.

The figures and descriptions provided herein may have been simplified to illustrate aspects that are relevant for a clear understanding of the herein described apparatuses, systems, and methods, while eliminating, for the purpose of clarity and/or brevity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of clarity and/or brevity a discussion of such elements and operations may not be provided herein. However, the present disclosure is deemed to nevertheless include all such elements, variations, and modifications to the described aspects that would be known to those of ordinary skill in the art in light of the instant disclosure.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may thus be embodied in different forms. As such, the embodiments should not be construed to limit the scope of the disclosure.

The terminology used herein is for the purpose of describing the particular example embodiments set forth only and is not intended to be limiting. For example, as used herein, the singular forms "a", "an" and "the" may be intended to include the plural forms as well, unless the context clearly indicates otherwise. Further, the terms "comprises," "comprising," "including," and "having," are inclusive and therefore may indicate the presence of stated features, integers, steps, operations, elements, and/or components, and, in any event, do not preclude the presence or addition of one or more other features, integers, steps, operations, elements, components, and/or groups thereof.

Although the terms first, second, third, etc., may be used herein to describe various elements, components, steps, regions, layers and/or sections, these elements, components, steps, regions, layers and/or sections should not be deemed to be limited by these terms. These terms may be only used to distinguish one element, component, step, region, layer or section from another element, component, step, region, layer or section, unless an indication is given to the contrary. Thus, terms such as "first," "second," and other numerical terms when used herein do not imply a sequence or order unless explicitly stated or clearly indicated by the context. Thus, a first element, component, step, region, layer or section discussed below could be termed a second element, component, step, region, layer or section without departing from the teachings of the exemplary embodiments.

Correspondingly and notwithstanding the use of terms such as "first" or "second" in association therewith, it should be noted that the method steps, processes, and operations described herein are not to be construed as necessarily requiring their performance in the particular order discussed or illustrated, unless specifically identified as a necessary order of performance. It is also to be understood that additional or alternative steps may be employed.

Processor-implemented modules, engines, systems and methods of use are disclosed herein that may provide networked access to a plurality of types of digital content, including but not limited to video, image, text, audio, data, metadata, algorithms, interactive and document content, which may track, deliver, manipulate, transform and report the accessed digital content. Described embodiments of these modules, engines, systems and methods are intended to be exemplary and not limiting. As such, it is contemplated that the herein described apparatuses, systems and methods may be adapted and may be extended to provide enhancements and/or additions to the exemplary modules, engines, systems and methods described, and thus the disclosure is thus intended to include all such extensions.

It should also be understood that the terms "module" and "engine", as used herein, do not limit the functionality to particular physical modules, but may include any number of tangibly-embodied software and/or hardware components having a transformative effect on at least a portion of a disclosed system and its data. In general, a computer program product in accordance with software-related embodiments may comprise a tangible computer usable medium (e.g., standard RAM, ROM, EEPROM, an optical disc, a USB drive, or the like) having computer-readable program code embodied therein, wherein the computer-readable program code is adapted to be executed by a processor (which may work in connection with an operating system) to implement one or more systems, functions and methods as described herein. In this regard, the disclosed software may be implemented in any desired language, and may be implemented as machine code, assembly code, byte code, interpretable source code, or the like (e.g., via C, C++, C#, Java, Actionscript, Objective-C, Javascript, CSS, XML, etc.), unless noted otherwise and by way of non-limiting example.

More particularly, the embodiments provide at least a method, system and apparatus of using artificial intelligence (AI), such as in the form of a learning electronic "agent", to assist human information technology (IT) personnel in classifying and resolving IT issues more quickly and efficiently, and thus in more optimally addressing open IT issues than would the known art. The disclosed AI agent provided may thus at least: classify information technology (IT) issues and notes (also referred to throughout as "tickets") to appropriate issue categories/contexts; provide at least one recommended solution to help solve the classified IT issue related to a currently open ticket, wherein the recommended solution may, at least in part, be based upon knowledge of prior solutions to similar issues; and automatically parse a user's input dialog regarding the IT issue to identify and create issue and solution pairs, which enables continuous updates to the translation models and recommendation models based at least upon implicit and explicit user feedback.

Specifically, embodiments of the apparatus, system and method may automatically classify issues into one or more of a series of available appropriate issue categories, and may recommend possible solutions and actions based, in part, upon that categorization which a user can manually implement or have automatically implemented, such through a user interface dedicated to resolving IT issues. As referenced, the issue classification and correspondent automatically proposed solutions may be improved based upon the accumulation of implicit and explicit user feedback. That is, the models employed by the disclosed apparatus, system and method may be automatically or semi-automatically updated based, in part, on the explicit and implicit feedback from one or more intra-enterprise and/or extra-enterprise users.

Thus, disclosed embodiments may automatically "learn" from IT personnel selections of either or both of issue classification and issue resolution, and whether the selected solution proves optimal; may organize that "learned" data into a continuously updated ranking of prospective solutions corresponding to categorical issues, which categories are themselves corresponded to user inputs; and may make that "learned" data and data organizational structure available to other IT personnel inside or outside (such as with security restrictions and/or data anonymization, as needed and as discussed below) the enterprise. Thus, while for known traditional knowledge bases, wikis, and/or documentations related to IT issue tickets, it has been necessary for IT personnel to devote extra time to maintaining records of issues, categories for the issues, and paired solutions to the IT issues for subsequent use outside of the normal IT workflow, in disclosed embodiments the knowledge base of IT solutions and classifications may by automatically created and maintained/updated. Thereby, IT personnel may avoid outer-workflow activities, thus saving time which allows IT personnel to maintain a focus on assisting clients, rather than suffering the distraction of doing extra-workflow research and record keeping.

Indeed, the classification capabilities disclosed may drastically reduce the time spent by IT personnel to categorize an IT issue, at least in that, instead of selecting a category from a list of 70+values as is necessary in the known art, some embodiments may allow IT personnel tech to select from a limited number, such as 5, of automatically recommended categories paired specifically to the user's input. And further, to the extent the user deems the categories and/or prospective solutions most highly ranked by the present apparatus, system and method to be suboptimal, the embodiments allow for feedback to continuously improve the models used, and thus the results provided. This feedback may be explicitly provided by the user, or may be implicit, such as wherein, if the top-ranked category is not selected by the user, the assessed feedback is that the top-ranked category perhaps should not have been ranked first. Needless to say, the embodiments may also similarly improve the providing and/or ranking of solution recommendations based on feedback.

The feedback captured by, and the continuously improved modelling thus provided by, the embodiments in an online, live network setting helps to keep the solutions and data used in the embodiments current and up to date. Yet further, the manner of capturing the data and feedback during live operation of an enterprise network, which may be a "closed system" runtime environment, readily allows for application of aspects of the disclosed embodiments, and particularly of the context-specific dialog discussed throughout, to other computer-system settings, such as in an aviation context, in an automotive context, and the like.

Of course, certain IT issues may nevertheless be best addressed by a human agent. As such, the disclosed automated systems and methods may refer matters to human agents as and if needed, such as if a high probability of a best solution cannot be assessed by the disclosed learning system. Further, these agents may be ranked as to the proprietary of solutions provided based on learnings of the disclosed learning system. These human agents may then be accessed in the embodiments in the order in which they are ranked, either generally, in relation to questions discerned by the learning system as being of a certain type, or based on assessed areas of optimal expertise.

Referring to FIG. 1, a system 110 for receiving, assessing, visualizing and providing solutions for information technology (IT) issues in a computer network 150, such as an enterprise network within a given enterprise, is illustrated. The aforementioned assessing and solving may include presenting prospective solutions to those IT issues in the network using at least an artificial intelligent dialog, as disclosed herein throughout. The system 110 thus includes components that receive automated digital or manual inquiries and alerts 115, also referred to as "tickets", as a dialog over time in relation to current network activity on network 150, wherein those tickets may indicate detected, suspected, and/or otherwise known node or network IT issues on network 150.

The network 150 may thus include system 110 within a security perimeter, such as inside a firewall, thereof, such as "on" a particular node of network 150. System 110 may thus have connectivity locally, remotely, or both locally and remotely, to some, most or all IT aspects of network 150 (such as may depend on administrative permissions). More particularly, this connectivity may include access to activity on at least ones of network nodes 150(1), 150(2) . . . . System 110 may include a visualization interface 130 for receiving information from a user, and transmitting information to a user, such as with regard to network 150 and/or its nodes 150(1), 150(2); a translation module 170 for "translating", as needed, information from and to the user such that the information is comprehensible to both the user and a solutions module 120; and the solutions module 120, which provides a proposed solution 118 or set of solutions 118 to the user responsive to an IT issue inquiry 115a.

More particularly, the exemplary system 110 may have communicatively accessible thereto detailed data regarding a secure, software-defined network 150, although it will be appreciated that the disclosed technologies may be implemented in or on any type of network environment or substantially closed computing environment. Aspects of the disclosed system 110 may be used by a human user, for example, to assess and address IT issues reflected in a ticket 115 relating to activity on the network 150, including, by way of non-limiting example, network security issues, compatibility issues, downtime issues, connectivity issues, issues that relate to uploads, downloads and updates, and/or inquiries to improve network operations management for network 150, and the like. For example, the system 110 may improve the performance, up time, or reliability of the network 150 and/or nodes 150(1), 150(2) . . . thereon, or of the software or hardware operating within network 150, such as on servers or nodes 150(1), 150(2) of network 150.

Components of the system 110 may generate the interface/interactive display/visualization 130 for the human user, wherein the interface 130 comprehensibly presents interactions to the user that the user has with system 110 based on the aforementioned tickets 115. For example, the system 110 may present a real-time visual depiction of the network 150 and/or certain nodes 150(1), 150(2) . . . and aspects thereof in the interface 130, such as including the current IT and/or network activity, and/or tickets 115 related thereto.

Needless to say, in some embodiments, the interface 130 may perform authentication processes to verify a user's identity and/or administrative permissions (as referenced above) before providing the visualization and/or access to system 110 to a user. For example, the user's identity may be verified in interface 130 using passwords, administrative credentials, voice, biometrics, or the like, alone or in various combinations.

As used herein, a "visualization" may include two-dimensional and/or three-dimensional graphics, images, videos, diagrams, animations, text, audio (e.g., non-speech sounds and/or speech), other forms of multimedia content, or a combination thereof which are indicative of activities on the network and/or dialog 135 with system 110. Additionally, output generated by interface 130 as the visualization may be historical, such as in the way of a past network visualization, directly diagnostic of the current state of the network 150 or aspects thereof, and/or may be predictive, such as in the way of a projected visualization of the future of network 150 or aspects thereof, by way of non-limiting example.

Once accessed by the user, aspects of the system 110, and more particularly of interface 130 including the visualization provided by interface 130, may allow for the conducting of a "conversational" dialog 135 with the human user via the visualization/interface 130. As used herein, the human user may be, by way of non-limiting example, an IT supervisor, agent, or other IT personnel at the enterprise which uses, owns, or controls the subject network 150 to which the ticket 115 relates. Of course, if the context of use of system 110 were to change, as referenced herein, to a different context, the duties ascribed herein to an IT personnel might reside with a different entity posing as the user, such as a pilot whose duty it is to maintain a flight safety system in an aviation context.

The conversational dialog 135 may include at least one or more of: a user dialog, such as a natural language dialog, such as a natural language search window 115a; a selectable menu of prospective issues (which may be hierarchically organized into "related" series of issues), which may or may not be provided responsive to the dialog/search 115a; and/or a listing of known prior issues and notes that may relate to a certain ticket 115 or IT issue, by way of example. More specifically, the dialog 135 may include at least a user inquiry/initial user inquiry 115a, or similar request for information from a user made to dialog 135 of interface 130. Responsive to this initial request 115a, a response dialog 115b may be provided by the system 110 to the requesting user, such as through dialog 135 via interface 130.

The response dialog 115b may request additional information from the user and/or may indicate to the human user one or more proposed classification of the inquiry 115a and/or one or more prospective solutions 118 to the inquiry 115a, such as in a listing or a menu format. The prospective solutions 118 may be based on at least: keywords or keymeanings (such as for natural language-capable searching) in the initial request 115a; prior solutions selected by that user when similar keymeanings/keywords were entered by that user; prior solutions selected by other users when similar keywords/keymeanings were entered by other users; and/or may additionally be based on a comparison of the keywords/keymeanings to communicative extra-network data sources 160, such as publically available solution sets and corresponded IT issues that may be available at one or more proprietary or public locations on the Internet, by way of non-limiting example.

Of note, because proposed solutions 118 may be calculated by solutions module 120 based on previously selected solutions of that user and/or of other users, the solutions 118 provided in the response dialog 115b responsively to each new query 115a, even to the same user, may, or are likely to, vary over time for the same or similar tickets 115. That is, the solutions module 120 that discerns the solutions 118, at least in part based on the user dialog 115a, 115b, provides the solution sets 118 in each case by "learning", such as based on the algorithms and models discussed throughout, from various information sources, including the prior selected solutions, any prior solutions previously deemed optimal or substantially optimal, such as by tracking module 185, and from other factors discussed herein throughout, over time.

Correspondingly, a user "Z" may select, upon first entry of an inquiry 115a of "Outlook plug-in A is inoperable", a solution 118 of "manually disable plug-in A under drop down B". However, this solution 118 may prove suboptimal for user Z, who may indicate that suboptimality into interface 130, and/or for other users intra- or extra-enterprise, which may lead to the software provider creating a patch for plug-in A in Outlook. Solutions module 120, such as through feedback from user Z, and/or other users, and/or from the software provider, may "learn" that the initially proposed solution has been deemed suboptimal, and when user Z enters to dialog 135, 12 months later after having forgotten the prior instance, an inquiry 115a of "plug-in A just crashed in Outlook", solutions engine 120 may then provide as the solution 118 (or top-ranked solution) "download patch 54321 from Outlook provider". That is, the solutions module 120 has "learned" an improved proposed solution 118 based on feedback.

Thus, in short, the solutions engine 120 may employ a learning model 120a to automatically parse IT issues to identify and create issue and resolution pairs that are continuously updated upon gaining of new knowledge, i.e., updates may be based upon selected options and/or the optimality of selected options upon implementation, such as may be indicated by a user or as may be indicated by tracking module 185 (which may automatically track the outcomes of implemented solutions 118, such as using predefined network 150 or node 150(1) performance criteria). Needless to say, embodiments may thus include a "ranking" by the solutions engine 120 of the solutions 118 provided based upon certain predetermined factors (such as the aforementioned tracked optimality of outcomes upon implementation) or upon user-selected factors (such as a user electing to rank the solutions 118 previously selected by that user previously higher than solutions selected by a majority of other users in similar circumstances), by way of non-limiting example. And, regardless of the combination of factors employed in ranking solutions 118, the factors may be adjusted based upon received feedback.

In embodiments, initial requests 115a may be expressed in any high-level manner that is intuitive to the human user, such as relative to the visual depiction provided by the visualization in interface 130, and/or may be of any level of specificity required by system 110, in order that solutions module 120 may comprehend the inquiry 115a and assess multiple prospective solutions 118. That is, in some embodiments an initial request 115a need not specify detailed network aspects, information or instructions in order for solutions module 120 to perform an assessment of prospective solutions, although such information may, of course, be included in an initial request 115a. Of note, because the solutions module 120 takes a holistic approach to providing a solution set 118, the more information provided to the dialog 135 in the initial request 115a, the more the proposed solution sets 118 may differ upon output, and the more feedback that may be obtained by feedback module 195.

The foregoing is the case because the translation engine 170 that may "translate" information between the user and solutions module 120 may translate using one or many translation algorithms/models 170a. That is, translation module 170 may use one or more models 170a to interpret a user interaction with interface 130 via dialog 135, and may convert the user interaction(s) to machine language (or other language comprehensible to solutions module 120) to readily allow for interaction between the user and the solutions module 120. Of course, the converse is also true in that translation module 170 may additionally translate communications from solutions engine 120 into communications 115b understandable to the user to be provided via dialog 135.

On the other hand, in some embodiments, user interactions may be implemented directly as device-executable instructions. That is, in some embodiments, the translation module 170 that typically converts "higher-level" user interactions to "lower-level" computer-executable requests may be omitted, as the initial requests 115a, for example, may include or be required to comprise sufficient detail and/or particular terms so as to themselves constitute lower-level directives or device-executable instructions suitable for execution by solutions module 120. As used herein, executable actions or instructions may refer to electronic device-executable instructions, such as computer code or executable scripts.

As translation module 170 thus allows for any of a variety of models for communication 115a, 115b between the user and the solutions engine 120, the dialog 135 may be keyword-based or natural language-based, i.e., keymeaning-based, by way of non-limiting example. Further, to the extent that dialog 135 may interact with translation module 170 using natural language, dialog 135 may be integrated with a touch, audio and/or gesture-based front-end 131 of interface 130, thereby supporting multi-modal interaction with interface 130 which may combine textual, verbal and/or nonverbal user input. In such an embodiment, a user may, for example, point to a particular area of the interface 130 and say "what applications are affected if we disconnect this node?", and this request would be received by front end 131 and translated by translation module 170 so that a solutions set 118 may be provided by solutions engine 120. The disclosed architecture may thereby, in some embodiments, enable human IT personnel to use intuitive, natural language dialog and other interaction types in order to, for example, explore IT issues, as well as to dictate effective remedial responses and provide feedback so as to mitigate those IT issues.

As referenced, the translation module 170 may thus utilize one or more models 170a to interpret the user interactions in the context of the system 110, e.g., the translation module 170 inquires what the interaction means in the context of dialog 135. Accordingly, the context, and the meaning, of an interaction through interface 130 may be assessed by translation module 170. Translation module 170 may thereby make assessments based on limited allowable interactions, i.e., using keywords, or based on substantially fewer or no limitations on allowable dialog, i.e., natural language, also referred to herein as a "keymeaning" interface. As discussed, the entry of a natural language, keymeaning type dialog 115a may also use a front end 131 to interface alternative user input and/or output from/to the user and to/from interface 130. Of course and as is well known, interface 130 may capture dialog 115a in the form of a text-based input via, for example, a touch pad, key pad, keyboard, touch screen, or other known computing peripheral that is locally or remotely associated with a computing device communicative with interface 130.

More specifically, "natural language" or "keymeaning" interactions, as sued herein, may include those human-machine interactions, such as searches, carried out in everyday language, wherein dialog 115a is phrased as it might be in common human conversation. Such conversational dialog 115a may be entered as text, audio, gestures, or the like, as discussed throughout as such as may require front end 131. This type of interaction is herein differentiated from keyword-based human-machine interaction, which is typical of Internet search engines and common in-application search interfaces. More particularly, keyword-based human-machine interactions attempt to break down a query into the most important terms based on predefined computing rules, and therefore get rid of words and phrases deemed by the machine to be connecting, unrelated or superfluous. Such words may include words like "how", "and", "the", and, in exemplary applications of the disclosed system 110, might also typically include "slang" IT-related words like "lost", "dropped", "bad", "ugly", "hung up", "messed-up", and so on.

Although all embodiments may be capable of a dialog 135 based on keywords, the foregoing detail is indicative of the advantageous nature of including keymeaning capability in the translation module 170, and specifically in applied model 170a, in some embodiments. For example and using the terms and phrases referenced above, an inexpert IT personnel might enter into dialog 135 "why is the new update to the document management system causing users to drop from Citrix when they save a document?" A keyword-based system may key on the terms/phrases "update", "document management system", "Citrix", and "save a document", and thus, in such an embodiment in which solutions module 120 receives only those keywords as the analysis from translation module 170, solutions module 120 may return a solutions set 118 that explains how to save a document in the document management system while accessing the network 150 remotely over Citrix. However, this is obviously not the actual IT issue that the IT personnel is seeking to solve in this example.

In contrast in the foregoing example, a translation module 170 that instead or additionally employs a keymeaning translation model 170a does not ignore the "superfluous" or seemingly unrelated terms, and thus reaches a different conclusion based on the context, or true nature, of the question above. A correct assessment of the true nature of the above inquiry is, in part, provided by the atypical "slang" term (for the IT space) "drop," which might be ignored as unrelated or superfluous by the keyword engine in the prior example. That is, the keymeaning translation, which considers this term "drop" and the context provided by it, would properly conclude that the IT user was seeking a solution set as to why Citrix would disconnect (i.e., "drop") a client upon an attempt to save to the document management system over Citrix. Correspondingly, solutions module 120 would receive this as the actual inquiry 115a from translation module 170, and would thus provide a much more useful solution set 118 back to the inquiring IT user.

Needless to say, not only has the inclusion of a keymeaning translation model 170a in the foregoing example improved the optimality of solutions set 118, but it additionally improves the efficiency of searching in the system 110 over known IT-solution applications. This enhanced efficiency is provided at least in that a user no longer needs to sit at the interface 130 and repeatedly try different keywords in dialog 135 until the provided solutions set 118 and/or the classification of the IT issue meets the actual interest of the IT user. And further, in embodiments including front end 131, the ability of system 110 to interact with an IT user through non-text means can be realistically provided using a natural language style translation, which, needless to say, is unavailable in a keyword-only translation.

By way of additional example, if the user enters into dialog 135 that "Outlook is not opening", while a keyword-based translation model 170a would likely return results discerned based on the keyword "Outlook", the disclosed embodiments, when employing a natural language keymeaning translation model 170a, may instead provide prospective solutions 118 such as "Reset the Profile", "Create a new .pst file", and the like, which do not necessarily focus solely on the term "Outlook" but instead also address the context provided by the phrase "not opening". Moreover, this enhanced efficiency of using keymeaning translation models 170a may be further improved by the direct user feedback and implied user feedback to the translation module 170 and the solutions module 120 that may be passed to feedback module 195, as discussed in more detail herein below.

Keyword and keymeaning discernment may occur via any known methodology serving as a translation model 170a. For example, translation module 170 may use any available model 170a to translate high-level user inputs into inquiries 115a and/or to provide back to the user responsive dialog 115b. As an initial step in any model 170a, the translation module 170 may translate a user inquiry into an intermediate, substantially or relatively platform independent format, i.e., a "normalization" may be performed.

Subsequently, the translation model 170a may process the normalized inquiry 115a (including inputs to dialog 135 and/or to front end 131, where applicable) with other inputs (such as a first comparative database of a context extraction module, as discussed below in relation to FIG. 3) to gain an "understanding" of the intent and/or context of the inquiry 115a. A context extraction module may then perform comparisons of the inquiry 115a in "natural language" keymeaning analysis, e.g., may compare inquiry 115a to known and learned words, phrases, verbal expressions, and/or combinations thereof, which are formulated by a human, device, or system in a fashion that is or is intended to approximate or simulate human speech or thought such as may normally arise in human conversation regarding the current topic and context (in this case, an IT issue); and/or in keyword analysis, e.g., an analysis more similar to a comparison made by structured computer programming languages or code, such as using Boolean operator limitations and the like. As used herein, an "intent" or a "context" may represent a likely intended goal, objective, or topic of interest to the user.

The translation model 170a may thus attempt to determine not only the words of the user input 115a, but rather the semantic meaning, e.g., the user's actual intended goal or objective, which those words were used to express. As an example, the user might inquire "why does the recent update to software X keep killing unrelated instantiation of software Y on an enterprise node"—which, in context, means that the user's "goal" is to find out why, each time an attempt is made to update a first software program on one of the nodes on the network, other software at that node ceases to operate. Determining this as the intended goal or objective of the user's natural language inquiry 115a to dialog 135 may involve the application by translation model 170a of artificial-intelligence (AI) based automated reasoning methods and systems, such as using implicit and/or explicit feedback, and such as using intra- and/or extra-network 150 information, as discussed throughout.

Thus, AI-based reasoning by model 170a may enable comparison of the inquiry 115a to the prospective solutions in a way that solutions model 120 can "understand", and/or may allow solutions model 120a to draw on the outcomes of prior solutions for application to similar problems in the network, even if those other problems, solutions, or outcomes used different terminologies to respectively describe them. For example, an illustrative translation model 170a may be embodied as an ontology that defines relationships or associations between various words or phrases and their interrelated meanings in the context specifically of IT, or as a set of rules, templates, or grammars, etc., applicable particularly to IT contexts. Subcontexts, such as conflicting programs in the above example (in which the main context may be software updates) may be automatically discerned by the model 170a, or may, in embodiments, be selectable by the user as discussed throughout, such as to further refine the dialog 135 to improve the proposed solutions sets 118 based on the user's inquiry 115a.

By way of further example, a user may inquire "there has been a breach, how do I disconnect a mobile node?" Although aspects of this phraseology may have myriad meanings outside of IT, the applied model 170a, applying rules encompassing natural language and context assessment, may allow the translation module 170 to recognize the "breach" as an indication that this is a network security issue, which may best allow for classification of the issue by translation module 170 and which may thus further inform the solution module's 120 assessment of the best solutions set 118 to accomplish the user's objective to disconnect a mobile node in the context of a breach. For example, in the context of a security breach assessed by the translation module 170, the solutions module 120 may recognize the desire by the user to receive a solutions set 118 that disconnects the offending node where the breach occurred, and the translation model 170a, and thus the solutions model 120a, may further realize that the offending node that should be encompassed by the solutions set 118 is specifically a "mobile" node. That is, the translation module 170 may apply a model 170a that recognizes context at a high-level, and that applies a rule-based parser and/or a statistical parser to provide a semantic interpretation of the entered dialog 115a in the subject context.

The translation model 170a may accordingly generate one or more possible output intents, such as wherein each intent is corresponded to a confidence level to be passed from the translation module 170 to the solutions module 120, such that the solutions module 120 may, in some embodiments, correspond a confidence level for each output proposed solution 118a, 118b . . . , which confidence level may, in part, depend on the confidence level of the classification output from translation module 170. A solution set 118 may be provided to the inquiring user with or without the corresponding confidence levels, such as to allow the user to make a better-informed selection of a solution 118 when confidence levels/ranks are included. This confidence assessment process may include system-generated requests in the response dialog 115b for further clarification of the user input 115a, such as in cases in which there is a relatively low confidence level in several or all of the proposed solutions sets 118, e.g., when the confidence level assessed by solutions engine 120 (and/or by translation module 170) is less than a predefined threshold.

The translation module 170 may thus employ one or more models 170a, either individually or in plural, and either in series or in parallel, wherein each model may include rules, templates, or classifiers (e.g., probabilistic or statistical classifiers) that directly or indirectly associate data or patterns from dialog 135 with various solution sets 118. The rules, templates, and/or classifiers of the applied model 170a or models may be predefined (i.e., may initially form part of system 110), may be developed and entered by a user, or may be learned by applying data and feedback, such as may be managed by the one or more feedback modules 195. For example, data and feedback processed by feedback module 195 may include user selections, user follow-up entries 115a into dialog, and/or selected solutions 118 of other users for similar IT issues. That is, feedback 195a may provide learning using supervised or unsupervised machine learning techniques, such as may provide learning based on dialog data and/or previously implemented solutions, either within the enterprise of interest, or across multiple enterprises. In the event learning occurs across multiple systems 110, 110a, 110b resident in distinct networks 150, 150(2), 150(3), the "global" learning may be updated to systems 110, 110a, 110b periodically, and/or may be made remotely accessible relatively constantly to each system 110, 110a, 110b. Also, such plural/global learning may use solely anonymized data, anonymized solutions, and/or anonymous communication of network results of a selected solution back to, for example, a multi-system remote hub 199 that collects individual data for each system 110, 110a, 110b. Thus, although the multi-system remote hub 199 may be two-way communication capable with each system 110, 110a, 110b, in embodiments the two-way communication may comprise only anonymized data flow from each system 110a, 110b, in part so as to insure data security for each enterprise.

The presented solution set 118 may be presented via interface 130, as discussed throughout. Of note, the interface 130 may, in certain embodiments, further include actuatable components 138 in the visualization presented to the user, which may be provided in order to implement ones of the reconfigurations and/or solutions presented in the solution set 118. By way of non-limiting example, one of the solutions 118 may be actuated via a simple actuation/click/touch by the user on a visual component 138 of the interface 130 corresponded to that solution 118, such as using a computing peripheral, such as a mouse, associated with the computing device displaying interface 130, by way of non-limiting example.

Moreover, as part of the interface 130, an isolated solution environment 142 may be provided in system 110. For example, the isolated environment 142 aspect of interface 130 may provide a "safe" environment in which a solution 118 may be "tested", such as in the form of a simulation, against the present data state of a node or network to assess an impact of implementation of that solution 118 from solution set 118, apart from and thus without access to the "live" network 150, before ultimate implementation of that solution 118 by the user. Such an impact analysis may be a "what if scenario" posed by the user. In short, an aspect of interface 130 may thus be configured to engage in a runtime simulation and perform an impact analysis of a selected or prospective solution 118 proposed by solutions engine 120, and this aspect may be embodied as an isolated environment 142, by way of non-limiting example. Correspondingly, interface 130 and/or environment 142 may be or include an analytics subsystem 127, which may include one or more rulesets that, given access to a data snapshot of nodes 150(1), 150(2) and/or network 150, may provide an executable simulation of what effect undertaking an action would likely have on that snapshot data.

Figure 2:
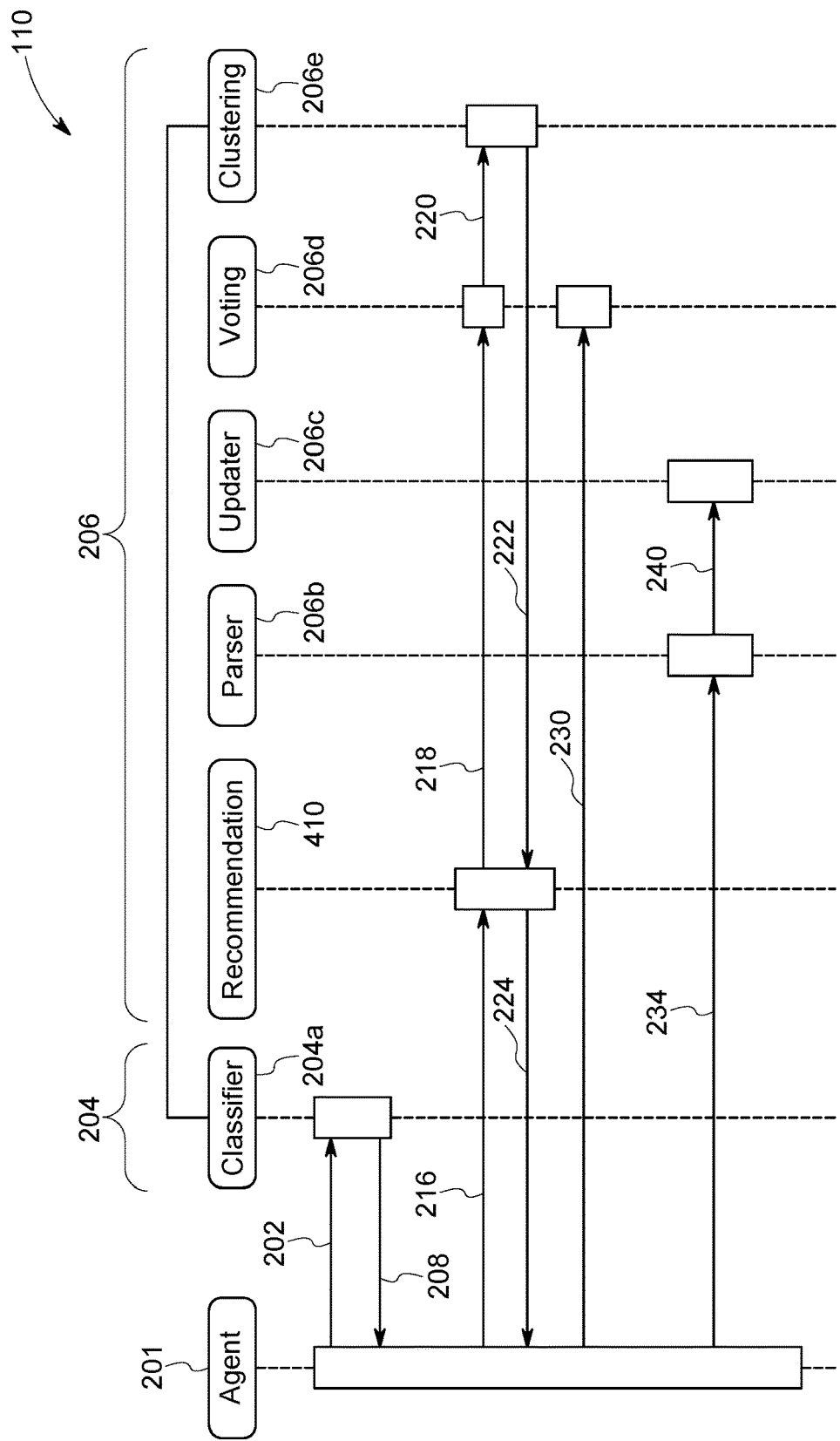
FIG. 2 is an illustration of a system level input/output (I/O) diagram.

Referring now also to FIG. 2, illustratively provided is a system 110 level I/O diagram. In the illustration, a user 201 provides an initial inquiry/request 202 to an additional embodiment of a translation module 204, which may be an additional or alternative embodiment of translation module 170 as discussed above, and which, in this illustration, includes a categorical/contextual classifier 204a. In the illustrated embodiment, an additional embodiment of a solutions module 206, which may be an additional or alternative embodiment of solutions module 120 as discussed above, is also provided, which, in this illustration, includes recommendation module 206 that applies a recommendation model 410, a parser module 206b, an updater module 206c, a voting module 206d, and a clustering module 206e. Of note, although the translation module 204 in this illustration may communicate classifications output back to the user 201 to allow the user 201 to properly frame a solution inquiry 208 that is comprehensible to the solutions module 206, it will be appreciated in light of the discussion throughout that the translation module 204 may affirmatively translate the initial inquiry 202 and communicate it directly to the solutions module 206 as referenced above, rather than communicating the translation back to the user 201 without passing the directly inquiry 202 on to the solutions module 206.

In an embodiment, the initial inquiry 202 elicits a translated response, i.e., a categorization and/or additional information of the initial inquiry 202 that makes the initial inquiry comprehensible to the solutions module 206. The translated inquiry is then passed to the recommendation model 410 at 216, which recommends a solutions set for ranking by the voting module 206d at 218. These ranked solutions are communicated to the clustering module 206e for clustering into related solutions at 220.

The clustering module 206e then communicates the related solutions set to the recommendation model 410 at step 222, which then passes the solutions set to the user at 224. The user 201 may then vote, or rank, such as impliedly by selecting one or more recommended solutions or explicitly by affirmatively ranking the solutions set, to voting module 206d at step 230. Thereby, the voting module 206d allows the solutions module 206 to "learn" in relation to providing subsequent solutions sets, as discussed throughout, which learning will, of course, lead to modifications to subsequent communications 220.

Additional learning by the solutions module 206 may be provided based on the outcome of the selected solutions. Indeed, user 201 may communicate 234 the selected solution and its outcome to parser module 206b. The parser module 206b may then parse the received communication 234 into data related to the optimality of the solution and/or its outcome, and this parsed information may be passed to the updater module 206c at 240. The updater module 206 may then allow for further "learning" by solutions module 206 regarding the quality of the solutions recommended, the ranking of the solutions, etc.

Figure 3:
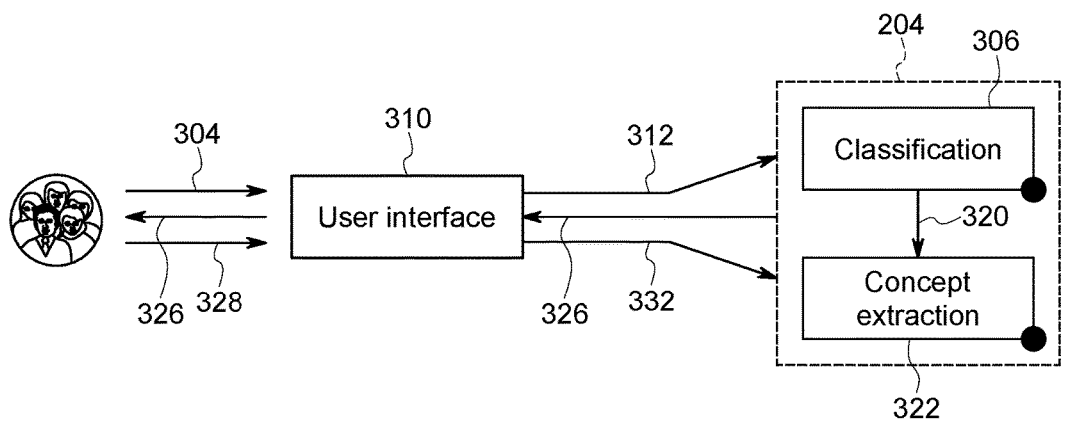
FIG. 3 is an illustration of a translation module of an IT issue system.

With reference now also to FIG. 3, an embodiment provides a translation module 204, akin to that illustrated in FIG. 2, suitable to classify the user inquiry 304, such as by category, by extracting relevant terminology and thus context. In the illustration, a text classification model 306 may automatically categorize an initial inquiry and/or new IT issue notes input by a user 304 to an interface 310.

More specifically, the user may enter an issue 304 to a dialog in interface 310, and the entered issue may be passed to the relevant translation model 306 at 312. In the illustration, the applied model 306 is a categorization translation, although it will be appreciated that myriad other or additional translation models 306 may be applied, as discussed throughout. The categorization translation model 306 parses the issue input 304, generates a ranked list of possible issue categories for that issue 320, and extracts categories, additional categories or subcategories from the concepts and context provided by the text, modifying the issue category list as needed using extraction module 322.

The results from the categorization model 306 are provided back to the user through the interface 310 at step 326. The user may then select the intended translation at step 328, which allows for the capturing of feedback related to the optimality of the applied categorization model 306. The applied model 306 may then be updated with the feedback 332. By way of example, when the user selects one of the categories, if the selected category wasn't ranked first by model 306, implicit feedback is captured.

In order to train and update model 306, IT issue notes from a training data set may be initially accumulated, and a first word embedding model "learned". The resultant word embedding model in this example consists of high dimensional vector representation for each word in the corpus of the issue notes in the training data set. A labeled training dataset of issue notes, along with the actual issue category of each issue note, may additionally be provided.

In pattern recognition and machine learning, a feature vector is an n-dimensional vector of numerical features that represents an object. Algorithms in machine learning typically require a numerical representation of objects, since such representations facilitate processing and statistical analysis. In order for the exemplary model 306 to generate feature vectors, the word embedding model is queried to get the individual word vectors, and these individual word vectors are combined to generate a single vector for each issue note.

The issue note vector and issue category may then be used to train the model 306 based on, by way of non-limiting example, the k-nearest neighbor approach. In pattern recognition, the k-nearest neighbor algorithm is a non-parametric method used for classification. The input consists of the k closest training examples in the feature space, and the output is a class membership. An object is classified by a majority vote of its neighbors, with the object being assigned to the class most common among its k nearest neighbors (wherein "k" is a positive integer). By way of example, if k=1, then the object is simply assigned to the class of that single nearest neighbor. As such, vector similarity may be employed to identify the k closest matches from the training data to produce a list of possible issue categories. The issue categories may be ranked in descending order based on the scores generated by vector similarity.

Possible additional issue categories and/or subcategories may be extracted by parsing the raw issue note using, for example, an ontology-guided concept extraction module. An ontology of issue categories, along with a list of synonyms, may be provided for concept extraction. The concept extraction may then, by way of non-limiting example, use a dictionary based approach to identify additional categories/subcategories in the issue note.

Additionally, the model 306 may be trained using feedback, as referenced throughout. For example, when the user selects a category, a vector representation of the issue note and the apparent impropriety of the top-ranked category may be generated and appended to the training data of the model 306, along with the "correct" issue category. This allows the system to continuously learn and improve the model 306.

Figure 4:
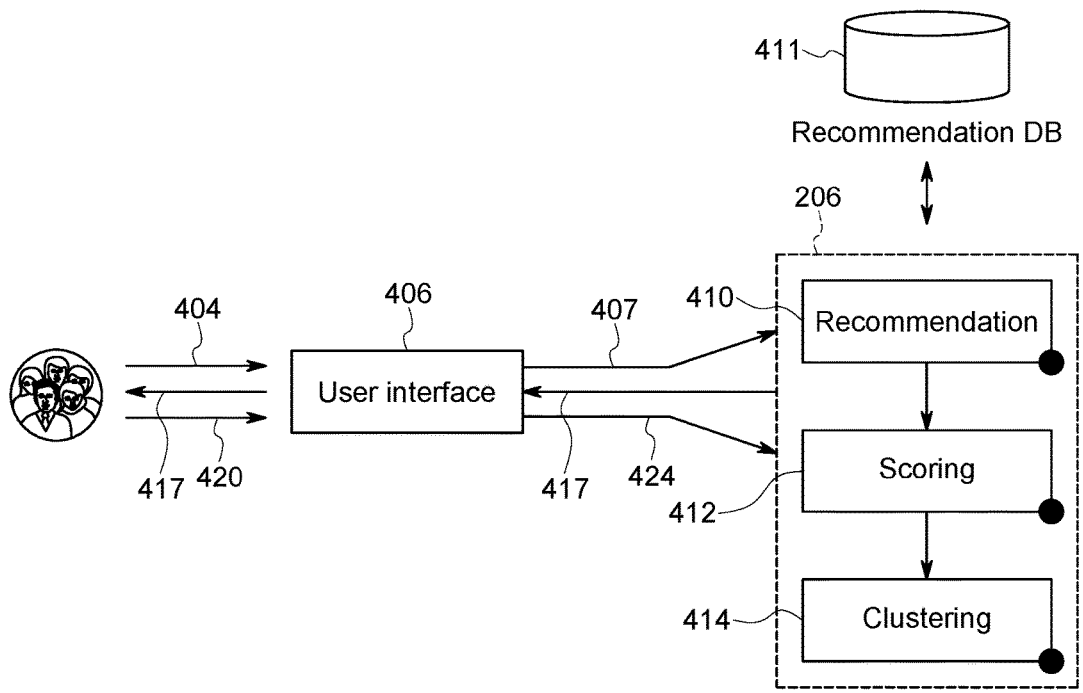
FIG. 4 is an illustration of a solutions module of an IT issue system.

Referring additionally to FIG. 4, an embodiment may include a solutions module 206 capable of recommending solutions to a user who enters an inquiry 404 into a user interface 406. As discussed above and when needed, the inquiry 404 may be translated, such as by a translation module, or may not be translated, and the inquiry is passed to the solutions module 206 at 407.

The solutions module 206 applies a recommendation model 410, which may use stored rules 411 and/or AI learning to identify similar or related issues, such as from previous history, and to generate a ranked list of possible solutions to the inquiry 404. A scoring module 412 may re-rank the resolutions by taking into account previous feedback, such as from the user. A clustering module 414 groups similar solutions together.

Possible solutions for the inquiry 404 produced by the solutions module 206 are provided to interface 406 at 417. The user may then select a solution from the provided solutions set at 420, and the applied model 410 may be updated with the feedback, such as regarding which solution was selected by the user, as well as the optimality of the outcome of the selected solution, at 424.

Aspects of the solutions module 206 may be trained in a manner similar to that discussed with respect to FIG. 3, by way of non-limiting example. For example, the inquiry may be converted into its vector representations. The inquiry vectors, along with their associated solutions, may be used to train the model 410, such as based on the k-nearest neighbor approach. By way of example, to recommend resolutions to IT issues in open tickets, the IT issue may be converted to its vector representation, and vector similarity, i.e., similarity scoring, may be used to find the "k" closest issues from the training data. The solutions associated with these k matches may then be used as recommendations.

Although the recommended solutions may initially be scored and ranked based on similarity scores, the scores of the recommended solutions may be adjusted based on previously provided user feedback, by way of non-limiting example and as referenced throughout. For example, an up-vote and down-vote (an exemplary up and down vote is shown in the interface diagram of FIG. 8) score for each solution may be formulated by identifying all previous issues for which the recommended solution was up-voted or down-voted, and by computing aggregate up-vote and down-vote scores based on the similarity between the current issue and the previous issues. The aggregate up and down scores may be unified into a single voting score by computing an average relative to an IT issue category, by way of non-limiting example.

The recommended solution score, or rank, may then be re-computed, such as with a weighted average score of the similarity score and the voting score, such as: (w1*similarity score)+(w2*voting score), wherein w1 and w2 represent weightings. A hierarchical clustering-based algorithm may further be used to group together similar resolutions before presenting them to the user.

Figure 5:
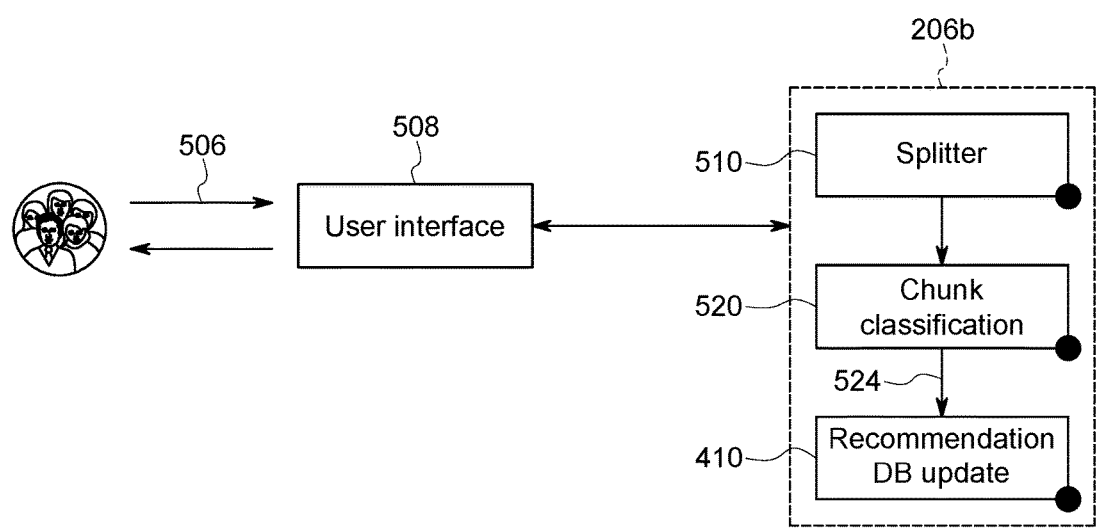
FIG. 5 is an illustration of a parser module of a solutions module of an IT issue system.

With reference now also to FIG. 5, as discussed herein an embodiment of a solutions module 206 may additionally include a parser module 206b. The parser module 206b may, such as indirectly, receive a user input 506 to interface 508.

The parser module 206b may include a splitter 510. The splitter may use, for example, syntactic patterns, such as dots, commas, semi-colons, and hyphens, by way of example, to split the input issue 506 into multiple syntactic "chunks". A chunk classification module 520 may then algorithmically classify each syntactic chunk as an "issue" or a "resolution", and may send the results back to interface 508 for review by the user.

The results from classification module 520 may be verified, either automatically by solutions module 206 or by the user of interface 508, by way of non-limiting example, and, once verified, may be added to the recommendation model 410 at 524. That is, the recommendation model 410 may be updated using this information at 524.

The parser module 206b thus "maintains" and updates the recommendation model 410, in part using the chunk classification module 520, in this illustration. The chunk classification module 520 may be trained in a manner similar to that discussed above. In short, the initial training data may consist of text along with a label indicating whether the text is an issue or a resolution. The text may be converted into its vector representation based on, for example, a word embedding based approach as described herein.

The text vector, along with its associated label, may then be used to train the chunk classification module 520, such as based on the aforementioned k-nearest neighbor approach, by way of non-limiting example. That is, each new chunk of text may be classified by converting it into vector representation and using vector similarity to find the k closest match. Feedback on the matches obtained, such as from the user, may then be used to modify the applied model(s).

Figure 6:
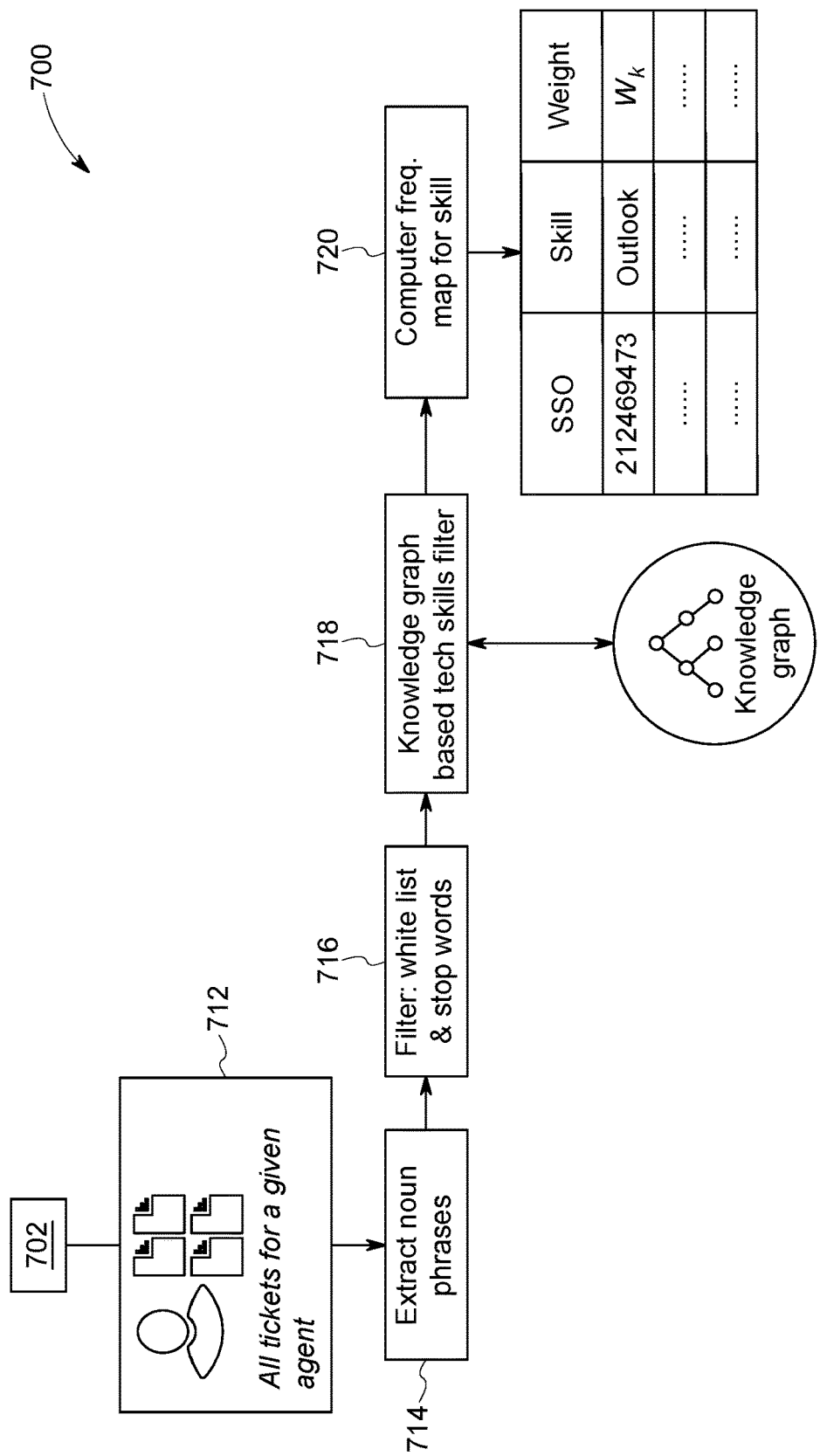
FIG. 6 is an illustration of a human expert recommendation module.
Figure 7:
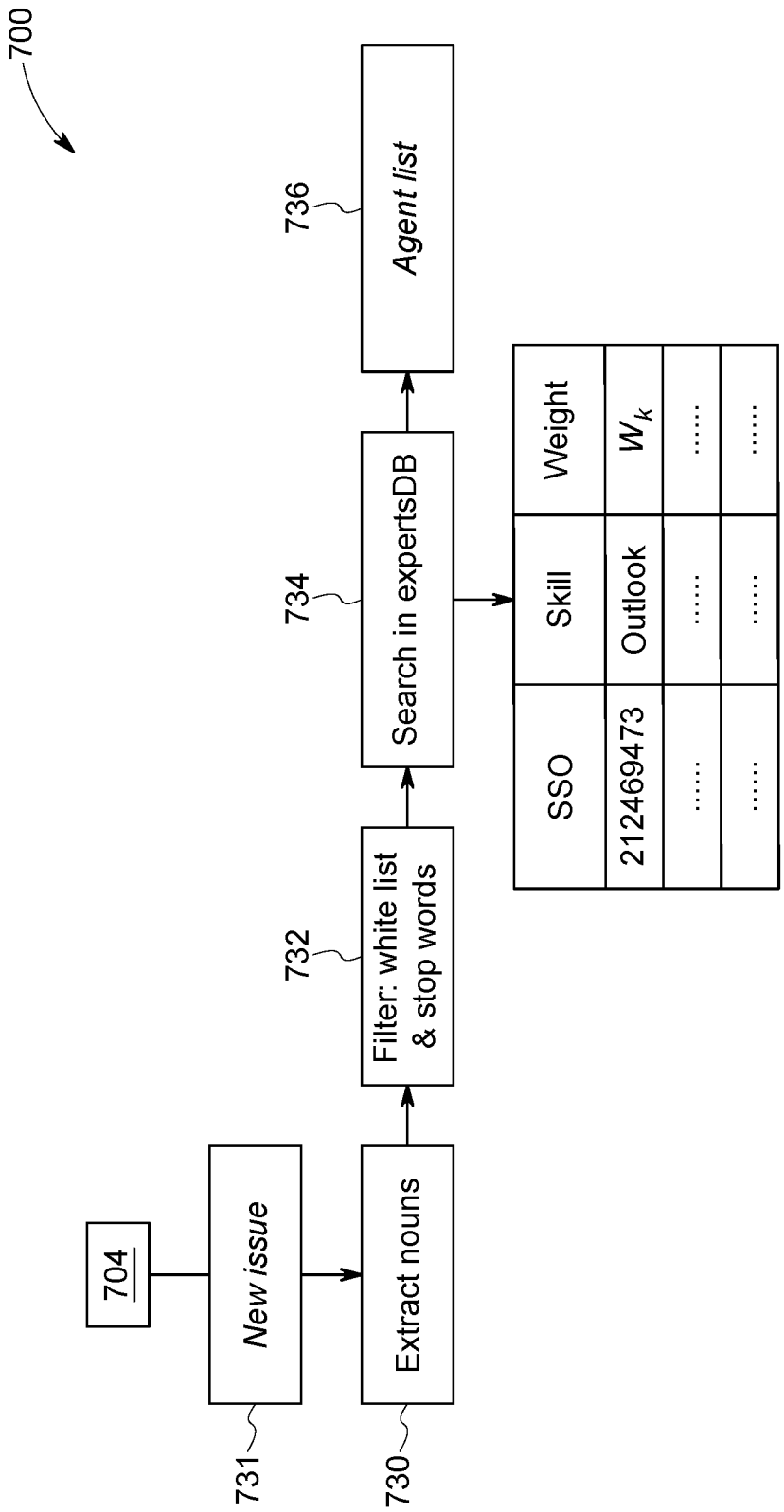
FIG. 7 is an illustration of a human expert recommendation module.

A human agent recommendation module, which assesses and suggests expert human agents by topic/need, such as responsive to a system suggestion for a need for a human agent to treat an open IT ticket, is illustrated in FIGS. 6 and 7. This human agent module 700 may include two aspects: an optimal skills/expertise assessment module 702, as illustrated in FIG. 6; and a recommending sub-module 704 for recommending a particular agent given a current IT issue, as illustrated in FIG. 7.

More specifically, FIG. 6 illustrates the parsing of historical issue notes for a given agent at step and extracting therefrom the skills in which the agent is most expert. Optimal skills may be, for example, a type of IT ticket that the agent is deemed best at solving, such as Outlook issues, Jabber issues, VPN issues, or the like. The expertise assessment module 702 may first access all previously handled issue notes for an agent at block 712. For each issue note, block 714 may further extract all the noun phrases from the sentences of the issue notes.

The extracted phrases may be further filtered based on a predefined accept and reject words list at block 716. The remaining phrases may then undergo additional filtering, such as a knowledge graph based filtering, by way of example, at block 718. By querying against an external knowledge graph, block 718 may verify if a phrase appears in a technical context or not. Phrases that do not appear in a technical context may be further filtered.

The remainder of the phrases may be added to a dictionary of skills for the agent at block 720. The skills dictionary may comprise a skills map in which skills are weighted to indicate which skills of that agent are most significant. The weights on each skill in this dictionary may be updated based on how often they appear in the historical issue notes for the agent, by way of non-limiting example.

FIG. 7 illustrates the use of a recommending sub-module 704 to generate a ranked list of recommended experts. To generate the list of recommended experts, block 730 may first parse the current issue note 731 and extract all nouns. The extracted set of nouns may be filtered using a predefined white and stop words list at block 732.

The remaining terms in the list may be used to perform a "fuzzy search" across the experts database created in block 734. The recommended agents may then be provided, such as ordered based on weights associated with their respective expertise, at block 736.

Figure 8:
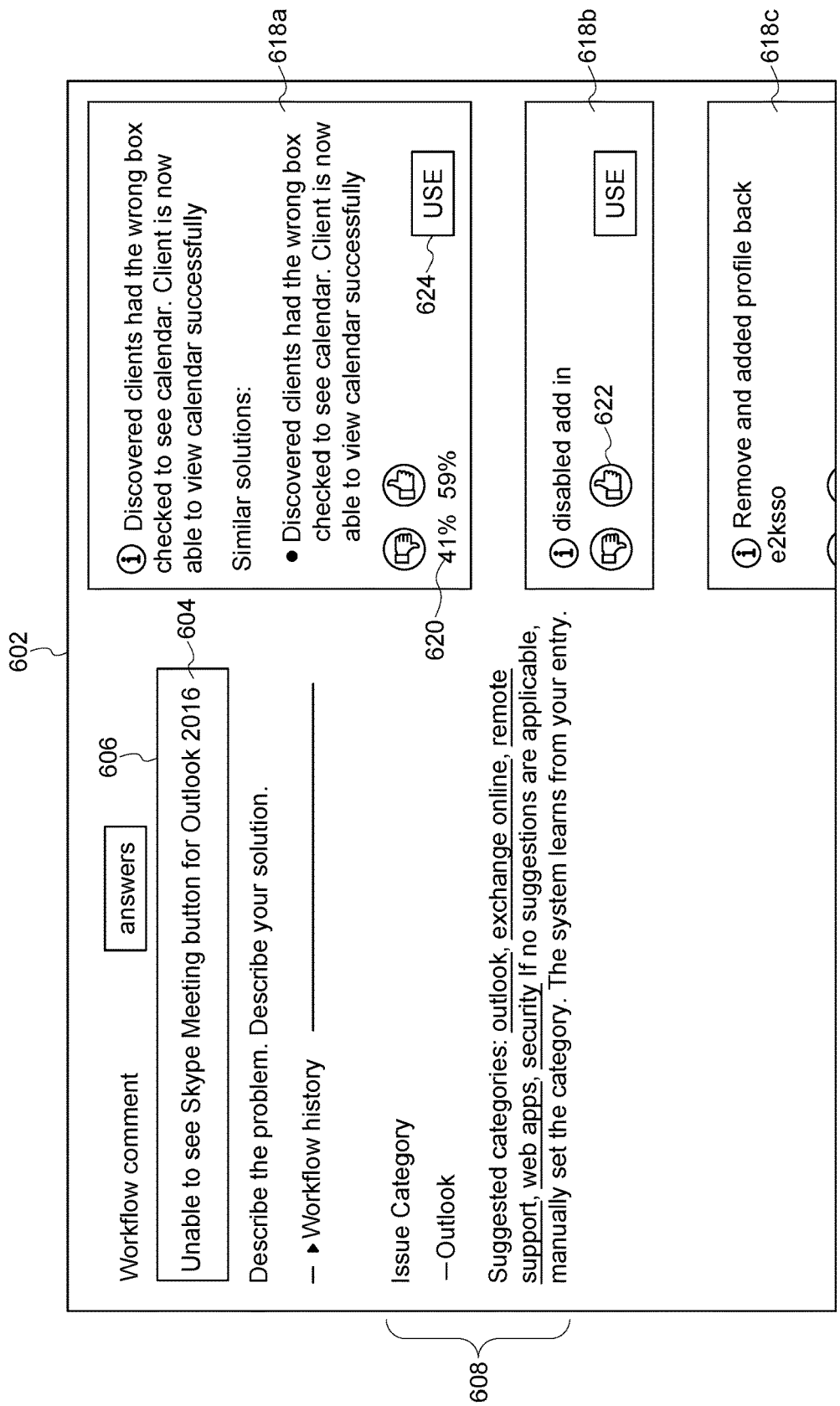
FIG. 8 is an illustration of an interface to an IT issue system.

FIG. 8 illustrates an embodiment of an interface 602 in accordance with disclosure. More particularly, illustratively shown is an embodiment of the visualization provided by interface 602, which may be an additional or alternative embodiment to the interface 130 discussed above. In the illustration, a user may enter an inquiry 604 into dialog 606. As is also shown, one or more categories 608 of prospective solutions 618a, 618b, 618c may be provided to the user, such as by the translation module 204 in communication with the solutions module 206 as discussed throughout. The prospective solutions 618a, 618b, 618c may be selectable by the user, such as to execute a solution and/or for the user to receive more information regarding one of the solutions 618. Also provided may be prior feedback 620 relating to use of the same or a similar solution, as well as a capability to provide current feedback on one or more of the solutions 622. Yet further, an indicator and/or actuator 624 may be provided in the event a solution 618a, 618b, 618c is to be elected by the user.

It should be understood that the disclosed embodiments of the system 110 may be embodied as software, firmware or hardware associated with one or more computing devices communicative with a networked computing system 100. For example, any of the components of the system 110 may be embodied as software written in a programming language such as Java, C++, Python, or the like. As used herein, "component," "module," "instruction," "subsystem," "system," "engine" or similar terminology may refer to one or more units of this computer code.

Portions of system 110 may specify or reside within conceptual layers of a network protocol stack of network 150 according to a reference model for software and/or firmware and/or hardware interaction, such as the Open Systems Interconnection (OSI) model. As such, portions of the disclosed system 110 may contain a graphical, numerical, textual, algorithmic, or mathematical representation of the manner in which communications across the network 150 and between the disclosed aspects are to be handled according to the reference model. As such, portions of the disclosed system may be abstracted, and such features related of the reference model may be independent of, but nevertheless encompassed by, the implementation details disclosed herein.

As used herein, a "network" may be implemented as a packet-switching digital communications network. A "packet" may refer to, among other things, a data packet, a network packet, a set of data and/or control communications, or portions of such communications, which are transmitted between nodes 150(1), 150(2) or otherwise travel on the network 150. Network 150 may be a public, private or semi-private, wired or wireless network defined by a network boundary, wherein the network boundary may establish a perimeter, such as a firewall, between the enterprise associated with the network 150 and one or more external networks, such as other private or semi-private networks or public networks, such as the Internet. A "node" 150(1), 150(2) on the network 150 may be any type of computing device, peripheral component, mobile device, a server computer, group of server computers, or any other electronic device (e.g., a device on the Internet-of-Things) that is communicatively connected to the network 150.

As referenced throughout, embodiments in accordance with the disclosure may be implemented in hardware, firmware, software, or any combination thereof, and thus embodiments may be implemented as code and/or instructions stored on or using one or more machine-readable media, which may be read and executed by one or more processors. A machine-readable medium may include any mechanism for storing or transmitting information in a form readable by a machine (such as a computing device or a "virtual machine" running on one or more computing devices). For example, a machine-readable medium may include any suitable form of volatile or non-volatile memory.

Modules, data structures, and the like are defined and explained herein for ease of discussion, and are thus not intended to imply that any specific implementation details are required. For example, any of the described modules and/or data structures may be combined or divided into sub-modules, sub-processes or other units of computer code or data as may be required by a particular design or implementation. Moreover, it is appreciated that exemplary computing systems as described herein are merely illustrative of computing environments in which the herein described systems and methods may operate, and thus does not limit the implementation of the herein described systems and methods from computing environments having differing components and configurations. That is to say, the concepts described herein may be implemented in various computing environments using various components and configurations.

In the description herein, numerous specific details, examples, and scenarios are set forth in order to provide a more thorough understanding of the disclosure. It will be appreciated by the skilled artisan, however, that embodiments of the disclosure may be practiced without such specific details. Further, such examples and scenarios are provided for illustration, and are not intended to limit the disclosure in any way.

For example, references in the specification to "an embodiment" indicate that the embodiment described may include a particular feature, structure, or characteristic, but it should be understood that every embodiment stemming from the disclosure, whether or not described herein, may not necessarily include the particular feature, structure, or characteristic. Moreover, it should be appreciated that reference to an "embodiment" throughout is not necessarily referring to the same embodiment.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and it will thus be evident that any generic principles defined herein may be applied to other variations without departing from the spirit or scope of the disclosure. Thus, the disclosure is not intended to be limited to the examples described herein, but rather is to be accorded the widest scope consistent with the principles and novel features disclosed herein.

What is claimed is:

1. An artificially intelligent (AI) agent capable of assisting an information technology (IT) personnel in addressing an IT ticket, the AI agent comprising non-transitory computing code, the AI agent configured to:
   receive, by a visualization interface, dialog from the IT personnel related to the IT ticket;
   translate the received dialog to a machine language translation;
   compare the machine language translation to a plurality of prospective solutions for IT issues, select a subset of the plurality of prospective solutions deemed most relevant to the IT ticket and return the subset to the visualization interface; and
   receive explicit and implied feedback from the IT personal regarding the machine language translation and the subset, wherein a selection of the subset varies upon subsequently received dialog according to the feedback.

2. The AI agent of claim 1, wherein the AI agent is further configured to classify the received dialog.

3. The AI agent of claim 2, wherein the the AI agent applies a natural language model to the received dialog.

4. The AI agent of claim 2, wherein the the AI agent classifies the received dialog by category.

5. The AI agent of claim 2, wherein the the AI agent classifies the received dialog by context.

6. The AI agent of claim 1, wherein at least two prospective machine language translations are proposed to the IT personnel at the visualization interface.

7. The AI agent of claim 6, wherein the at least two prospective machine language translations are ranked at the visualization interface based on the feedback.

8. The AI agent of claim 7, wherein a received user election of a ranked prospective machine language translation of the at least two prospective machine language translations comprises implied feedback.

9. The AI agent of claim 1, wherein the prospective solutions in the subset are ranked at the visualization interface based on the feedback.

10. The AI agent of claim 1, wherein a received user election of one of the prospective solutions in the subset comprises implied feedback.

11. The AI agent of claim 1, further comprising an actuation element in the visualization interface suitable to receive an election, from the IT personnel, of one prospective solution from the subset, and further capable of executing the one prospective solution.

12. The AI agent of claim 1, wherein the AI agent comprises a series of pairs, each pair of the series of pairs including one machine language translation of a particular IT issue and one prospective solution of the plurality of prospective solutions, and wherein the subset variation upon the subsequently received dialog comprises modification to the series of pairs.

13. The AI agent of claim 1, wherein the AI agent comprises a series of pairs, each pair of the series of pairs including a received dialog and a machine language translation of the received dialog, and wherein the feedback causes modification to the series of pairs.

14. The AI agent of claim 1, wherein the AI agent elect's users other than the IT personnel from the subset responsive to IT issues similar to the IT ticket.

15. The AI agent of claim 14, wherein the users are intra-enterprise with the IT personnel.

16. The AI agent of claim 14, wherein the users are extra-enterprise with the IT personnel.

17. The AI agent of claim 14, wherein information related to the users and the similar IT issues is anonymized.

18. The AI agent of claim 1, wherein the explicit feedback comprises at least an assessment by the IT personnel of optimality of the subset.

19. The AI agent of claim 1, wherein the feedback further comprises a tracking by the AI agent of optimality of the subset upon execution of the subset.

20. The AI agent of claim 1, wherein the subset is executed by the AI agent prior to execution in a live network associated with the AI agent.

21. The AI agent of claim 1, wherein the machine language translation is parsed, by the AI agent, for nouns indicative of prior IT tickets optimally treated by the IT personnel, and wherein the IT personnel are ranked accordingly for the IT ticket, and wherein an optimal one of the IT personnel for the IT ticket is selected based on the ranking.

* * * * *